US012540474B2

(12) United States Patent
Nguyen et al.

(10) Patent No.: US 12,540,474 B2
(45) Date of Patent: Feb. 3, 2026

(54) ELECTRICALLY GROUNDING METAL ROOFING SHINGLES WITH PHOTOVOLTAIC SYSTEMS

(71) Applicant: GAF Energy LLC, Parsippany, NJ (US)

(72) Inventors: Thierry Nguyen, San Francisco, CA (US); Gary Rossi, San Francisco, CA (US); Peter Wilke, San Jose, CA (US); David Meakin, Santa Clara, CA (US); Anshul Gaur, San Francisco, CA (US); Brian West, San Francisco, CA (US)

(73) Assignee: GAF Energy LLC, Parsippany, NJ (US)

(*) Notice: Subject to any disclaimer, the term of this patent is extended or adjusted under 35 U.S.C. 154(b) by 0 days.

(21) Appl. No.: 19/273,675

(22) Filed: Jul. 18, 2025

(65) Prior Publication Data

US 2026/0022560 A1 Jan. 22, 2026

Related U.S. Application Data

(60) Provisional application No. 63/674,050, filed on Jul. 22, 2024.

(51) Int. Cl.

*E04D 13/18* (2018.01)
*E04D 1/00* (2006.01)

(Continued)

(52) U.S. Cl.

CPC ............. *E04D 1/18* (2013.01); *E04D 1/2918* (2019.08); *E04D 1/2942* (2019.08); *E04D 1/34* (2013.01);

(Continued)

(58) Field of Classification Search

CPC ........... E04D 1/18; E04D 1/2918; E04D 1/34; E04D 2001/3423; E04D 2001/3461; H02S 20/23

See application file for complete search history.

(56) References Cited

U.S. PATENT DOCUMENTS

| | | | | |
|---|---|---|---|---|
| 1,431,102 A * | 10/1922 | Staley | .................. E04D 1/2918 | 52/523 |
| 1,431,103 A * | 10/1922 | Donahue | ............... E04D 1/2928 | D25/139 |

(Continued)

FOREIGN PATENT DOCUMENTS

| | | |
|---|---|---|
| CA | 2829440 A | 5/2019 |
| CH | 700095 A2 | 6/2010 |

(Continued)

OTHER PUBLICATIONS

Sunflare, Procducts: “Sunflare Develops Prototype For New Residential Solar Shingles”; 2019 <<sunflaresolar.com/news/sunflare-develops-prototype-for-new-residential-solar-shingles>> retrieved Feb. 2, 2021.

(Continued)

*Primary Examiner* — Basil S Katcheves

(74) *Attorney, Agent, or Firm* — GREENBERG TRAURIG, LLP

(57) ABSTRACT

A roofing system, including at least a first, second, and third metal roofing shingle installed on a roof deck adjacent to a plurality of photovoltaic modules, the first and second metal roofing shingles installed in a first row on the roof deck, the third metal roofing shingle installed in a second row on the roof deck, each of the metal roofing shingles including a metal layer and a cover layer, the metal layer including a conductive metal, the cover layer overlaying a portion of the metal layer and exposing at least one side lap of the metal layer, the side lap of the metal layer of the second metal roofing shingle overlaying and in electrical contact with the (Continued)

side lap of the metal layer of the first metal roofing shingle, to form a first grounding path, and the third metal roofing shingle in electrical contact with the first metal roofing shingle, to form a second grounding path.

14 Claims, 5 Drawing Sheets

(51) Int. Cl.
*E04D 1/18* (2006.01)
*E04D 1/34* (2006.01)
*F16B 15/06* (2006.01)
*F16B 43/00* (2006.01)
*H02S 20/23* (2014.01)

(52) U.S. Cl.
CPC .............. *F16B 15/06* (2013.01); *F16B 43/00* (2013.01); *H02S 20/23* (2014.12); *E04D 2001/3423* (2013.01); *E04D 2001/3461* (2013.01); *E04D 2001/3494* (2013.01)

(56) References Cited

U.S. PATENT DOCUMENTS 1,431,869 A * 10/1922 Bergen ...................... E04D 1/34 206/338
1,432,999 A * 10/1922 Greenstreet ........... E04D 1/2942 52/531
1,436,813 A * 11/1922 Macinnes ................. E04D 1/22 52/525
1,436,945 A * 11/1922 Clifton .................. E04D 1/2918 52/530
1,496,336 A * 6/1924 Ennis ........................ E04D 1/20 52/530
1,643,445 A * 9/1927 Call ...................... E04D 1/2942 52/530
1,981,467 A 11/1934 Radtke
3,156,497 A 11/1964 Lessard
3,269,075 A * 8/1966 Cosden ..................... E04D 1/06 52/302.1
3,581,779 A 6/1971 Gilbert, Jr.
4,218,857 A * 8/1980 Vallee ................... E04D 1/2942 52/530
4,244,353 A * 1/1981 Straza ....................... E04D 1/24 126/622
4,258,948 A 3/1981 Hoffmann
4,349,220 A 9/1982 Carroll et al.
4,499,702 A 2/1985 Turner
4,636,577 A 1/1987 Peterpaul
5,167,579 A 12/1992 Rotter
5,437,735 A 8/1995 Younan et al.
5,590,495 A 1/1997 Bressler et al.
5,613,337 A * 3/1997 Plath ......................... E04D 1/18 52/529
5,642,596 A 7/1997 Waddington
6,008,450 A 12/1999 Ohtsuka et al.
6,033,270 A 3/2000 Stuart
6,046,399 A 4/2000 Kapner
6,201,180 B1 3/2001 Meyer et al.
6,220,329 B1 4/2001 King et al.
6,308,482 B1 10/2001 Strait
6,320,114 B1 11/2001 Kuechler
6,320,115 B1 11/2001 Kataoka et al.
6,336,304 B1 1/2002 Mimura et al.
6,341,454 B1 1/2002 Koleoglou
6,407,329 B1 6/2002 Iino et al.
6,576,830 B2 6/2003 Nagao et al.
6,928,781 B2 8/2005 Desbois et al.
6,972,367 B2 12/2005 Federspiel et al.
7,138,578 B2 11/2006 Komamine
7,155,870 B2 1/2007 Almy
7,178,295 B2 2/2007 Dinwoodie
7,487,771 B1 2/2009 Eiffert et al.
7,587,864 B2 9/2009 McCaskill et al.
7,678,990 B2 3/2010 McCaskill et al.
7,678,991 B2 3/2010 McCaskill et al.
7,748,191 B2 7/2010 Podirsky
7,819,114 B2 10/2010 Augenbraun et al.
7,824,191 B1 11/2010 Podirsky
7,832,176 B2 11/2010 McCaskill et al.
8,118,109 B1 2/2012 Hacker
8,168,880 B2 5/2012 Jacobs et al.
8,173,889 B2 5/2012 Kalkanoglu et al.
8,210,570 B1 7/2012 Railkar et al.
8,276,329 B2 10/2012 Lenox
8,312,693 B2 11/2012 Cappelli
8,319,093 B2 11/2012 Kalkanoglu et al.
8,333,040 B2 12/2012 Shiao et al.
8,371,076 B2 2/2013 Jones et al.
8,375,653 B2 2/2013 Shiao et al.
8,404,967 B2 3/2013 Kalkanoglu et al.
8,410,349 B2 4/2013 Kalkanoglu et al.
8,418,415 B2 4/2013 Shiao et al.
8,438,796 B2 5/2013 Shiao et al.
8,468,754 B2 6/2013 Railkar et al.
8,468,757 B2 6/2013 Krause et al.
8,505,249 B2 8/2013 Geary
8,512,866 B2 8/2013 Taylor
8,513,517 B2 8/2013 Kalkanoglu et al.
8,522,493 B1 * 9/2013 Rogers .................... H02S 40/36 52/173.3
8,586,856 B2 11/2013 Kalkanoglu et al.
8,601,754 B2 12/2013 Jenkins et al.
8,629,578 B2 1/2014 Kurs et al.
8,646,228 B2 2/2014 Jenkins
8,656,657 B2 2/2014 Livsey et al.
8,671,630 B2 3/2014 Lena et al.
8,677,702 B2 3/2014 Jenkins
8,695,289 B2 4/2014 Koch et al.
8,713,858 B1 5/2014 Xie
8,713,860 B2 5/2014 Railkar et al.
8,733,038 B2 5/2014 Kalkanoglu et al.
8,776,455 B2 7/2014 Azoulay
8,789,321 B2 7/2014 Ishida
8,793,940 B2 8/2014 Kalkanoglu et al.
8,793,941 B2 8/2014 Bosler et al.
8,826,607 B2 9/2014 Shiao et al.
8,835,751 B2 9/2014 Kalkanoglu et al.
8,863,451 B2 10/2014 Jenkins et al.
8,898,970 B2 12/2014 Jenkins et al.
8,925,262 B2 1/2015 Railkar et al.
8,943,766 B2 2/2015 Gombarick et al.
8,946,544 B2 2/2015 Jabos et al.
8,950,128 B2 2/2015 Kalkanoglu et al.
8,959,848 B2 2/2015 Jenkins et al.
8,966,838 B2 3/2015 Jenkins
8,966,850 B2 3/2015 Jenkins et al.
8,994,224 B2 3/2015 Mehta et al.
9,032,672 B2 5/2015 Livsey et al.
9,035,176 B2 * 5/2015 Keller ..................... H02S 20/00 439/97
9,121,178 B2 9/2015 Belt et al.
9,153,950 B2 10/2015 Yamanaka et al.
9,166,087 B2 10/2015 Chihlas et al.
9,169,646 B2 10/2015 Rodrigues et al.
9,170,034 B2 10/2015 Bosler et al.
9,178,465 B2 11/2015 Shiao et al.
9,202,955 B2 12/2015 Livsey et al.
9,212,832 B2 12/2015 Jenkins
9,217,584 B2 12/2015 Kalkanoglu et al.
9,270,221 B2 2/2016 Zhao
9,273,885 B2 3/2016 Rodrigues et al.
9,276,141 B2 3/2016 Kalkanoglu et al.
9,331,224 B2 5/2016 Koch et al.
9,356,174 B2 5/2016 Duarte et al.
9,359,014 B1 6/2016 Yang et al.
9,412,890 B1 8/2016 Meyers
9,528,270 B2 12/2016 Jenkins et al.
9,605,432 B1 3/2017 Robbins
9,711,672 B2 7/2017 Wang
9,755,573 B2 9/2017 Livsey et al.
9,786,802 B2 10/2017 Shiao et al.

(56) References Cited

U.S. PATENT DOCUMENTS 9,831,818 B2 11/2017 West
9,912,284 B2 3/2018 Svec
9,923,515 B2 3/2018 Rodrigues et al.
9,938,729 B2 4/2018 Coon
9,991,412 B2 6/2018 Gonzalez et al.
9,998,067 B2 6/2018 Kalkanoglu et al.
10,027,273 B2 7/2018 West et al.
10,115,850 B2 10/2018 Rodrigues et al.
10,128,660 B1 11/2018 Apte et al.
10,156,075 B1 12/2018 McDonough
10,187,005 B2 1/2019 Rodrigues et al.
10,256,765 B2 4/2019 Rodrigues et al.
10,284,136 B1 5/2019 Mayfield et al.
10,454,408 B2 10/2019 Livsey et al.
10,530,292 B1 1/2020 Cropper et al.
10,560,048 B2 2/2020 Fisher et al.
10,563,406 B2 2/2020 Kalkanoglu et al.
D879,031 S 3/2020 Lance et al.
10,579,028 B1 3/2020 Jacob
10,640,980 B2 * 5/2020 Haddock .................. H01R 4/58
10,784,813 B2 9/2020 Kalkanoglu et al.
D904,289 S 12/2020 Lance et al.
10,852,038 B2 * 12/2020 Rothschild .............. H02S 30/10
11,012,026 B2 5/2021 Kalkanoglu et al.
11,085,187 B2 8/2021 Grubka et al.
11,177,639 B1 11/2021 Nguyen et al.
11,217,715 B2 1/2022 Sharenko et al.
11,251,744 B1 2/2022 Bunea et al.
11,258,399 B2 2/2022 Kalkanoglu et al.
11,283,394 B2 3/2022 Perkins et al.
11,309,828 B2 4/2022 Sirski et al.
11,394,344 B2 7/2022 Perkins et al.
11,424,379 B2 8/2022 Sharenko et al.
11,431,280 B2 8/2022 Liu et al.
11,431,281 B2 8/2022 Perkins et al.
11,444,569 B2 9/2022 Clemente et al.
11,454,027 B2 9/2022 Kuiper et al.
11,459,757 B2 10/2022 Nguyen et al.
11,486,144 B2 11/2022 Bunea et al.
11,489,482 B2 11/2022 Peterson et al.
11,496,088 B2 11/2022 Sirski et al.
11,508,861 B1 11/2022 Perkins et al.
11,512,480 B1 11/2022 Achor et al.
11,527,665 B2 12/2022 Boitnott
11,545,927 B2 1/2023 Abra et al.
11,545,928 B2 1/2023 Perkins et al.
11,658,470 B2 5/2023 Nguyen et al.
11,661,745 B2 5/2023 Bunea et al.
11,689,149 B2 6/2023 Clemente et al.
11,705,531 B2 7/2023 Sharenko et al.
11,728,759 B2 8/2023 Nguyen et al.
11,732,490 B2 8/2023 Achor et al.
11,811,361 B1 11/2023 Farhangi et al.
11,824,486 B2 11/2023 Nguyen et al.
11,824,487 B2 11/2023 Nguyen et al.
11,843,067 B2 12/2023 Nguyen et al.
2002/0053360 A1 5/2002 Kinoshita et al.
2002/0129849 A1 9/2002 Heckeroth
2003/0101662 A1 6/2003 Ullman
2003/0132265 A1 7/2003 Villela et al.
2003/0154666 A1 * 8/2003 Dinwoodie ............... E04D 1/20
52/173.3
2003/0154667 A1 * 8/2003 Dinwoodie ............. H10F 77/63
52/173.3
2003/0177706 A1 * 9/2003 Ullman ................. F24S 25/636
52/3
2003/0217768 A1 11/2003 Guha
2004/0000334 A1 1/2004 Ressler
2004/0045596 A1 * 3/2004 Lawheed .............. H10F 77/488
136/246
2005/0030187 A1 2/2005 Peress et al.
2005/0115603 A1 6/2005 Yoshida et al.
2005/0144870 A1 7/2005 Dinwoodie
2005/0178428 A1 8/2005 Laaly et al.
2005/0193673 A1 9/2005 Rodrigues et al.
2006/0042683 A1 3/2006 Gangemi
2006/0046084 A1 3/2006 Yang et al.
2007/0074757 A1 4/2007 Mellott et al.
2007/0181174 A1 8/2007 Ressler
2007/0193618 A1 8/2007 Bressler et al.
2007/0249194 A1 10/2007 Liao
2007/0295385 A1 12/2007 Sheats et al.
2008/0006323 A1 1/2008 Kalkanoglu et al.
2008/0035140 A1 2/2008 Placer et al.
2008/0078440 A1 4/2008 Lim et al.
2008/0185748 A1 8/2008 Kalkanoglu
2008/0271774 A1 11/2008 Kalkanoglu et al.
2008/0289682 A1 11/2008 Adriani et al.
2008/0302030 A1 12/2008 Stancel et al.
2008/0315061 A1 12/2008 Fath
2009/0000222 A1 1/2009 Kalkanoglu et al.
2009/0014057 A1 1/2009 Croft et al.
2009/0014058 A1 1/2009 Croft et al.
2009/0019795 A1 1/2009 Szacsvay et al.
2009/0044850 A1 2/2009 Kimberley
2009/0114261 A1 5/2009 Stancel et al.
2009/0133340 A1 5/2009 Shiao et al.
2009/0159118 A1 6/2009 Kalkanoglu et al.
2009/0178350 A1 7/2009 Kalkanoglu et al.
2009/0229652 A1 9/2009 Mapel et al.
2009/0275247 A1 11/2009 Richter et al.
2010/0019580 A1 1/2010 Croft et al.
2010/0095618 A1 4/2010 Edison et al.
2010/0101634 A1 4/2010 Frank et al.
2010/0116325 A1 5/2010 Nikoonahad
2010/0131108 A1 5/2010 Meyer
2010/0139184 A1 6/2010 Williams et al.
2010/0146878 A1 6/2010 Koch et al.
2010/0159221 A1 6/2010 Kourtakis et al.
2010/0170169 A1 7/2010 Railkar et al.
2010/0186798 A1 7/2010 Tormen et al.
2010/0242381 A1 9/2010 Jenkins
2010/0313499 A1 12/2010 Gangemi
2010/0325976 A1 12/2010 DeGenfelder et al.
2010/0326488 A1 12/2010 Aue et al.
2010/0326501 A1 12/2010 Zhao et al.
2011/0030761 A1 2/2011 Kalkanoglu et al.
2011/0036386 A1 2/2011 Browder
2011/0036389 A1 2/2011 Hardikar et al.
2011/0048507 A1 3/2011 Livsey et al.
2011/0058337 A1 3/2011 Han et al.
2011/0061326 A1 3/2011 Jenkins
2011/0100436 A1 5/2011 Cleereman et al.
2011/0104488 A1 5/2011 Muessig et al.
2011/0132427 A1 6/2011 Kalkanoglu et al.
2011/0168238 A1 7/2011 Metin et al.
2011/0239555 A1 10/2011 Cook et al.
2011/0302859 A1 12/2011 Crasnianski
2011/0314753 A1 12/2011 Farmer et al.
2012/0034799 A1 2/2012 Hunt
2012/0060434 A1 3/2012 Jacobs
2012/0060902 A1 3/2012 Drake
2012/0085392 A1 4/2012 Albert et al.
2012/0137600 A1 6/2012 Jenkins
2012/0176077 A1 7/2012 Oh et al.
2012/0212065 A1 8/2012 Cheng et al.
2012/0233940 A1 9/2012 Perkins et al.
2012/0240490 A1 9/2012 Gangemi
2012/0260977 A1 10/2012 Stancel
2012/0266942 A1 10/2012 Komatsu et al.
2012/0279150 A1 11/2012 Pislkak et al.
2012/0282437 A1 11/2012 Clark et al.
2012/0291848 A1 11/2012 Sherman et al.
2012/0304559 A1 * 12/2012 Ishida ..................... H10F 19/31
52/173.3
2013/0008499 A1 1/2013 Verger et al.
2013/0014455 A1 1/2013 Grieco
2013/0118558 A1 5/2013 Sherman
2013/0193769 A1 8/2013 Mehta et al.
2013/0212959 A1 * 8/2013 Lopez ..................... H02S 40/36
52/173.3
2013/0247988 A1 9/2013 Reese et al.
2013/0284267 A1 10/2013 Plug et al.
2013/0306137 A1 11/2013 Ko

(56) References Cited

U.S. PATENT DOCUMENTS

2014/0090696 A1* 4/2014 Rodrigues ............... H02S 40/32 136/251
2014/0090697 A1 4/2014 Rodrigues et al.
2014/0102518 A1* 4/2014 Chihlas ................... H10F 19/80 136/251
2014/0102556 A1* 4/2014 Malpas ................... H02S 20/23 137/360
2014/0109954 A1* 4/2014 Kanbara ................. H02S 20/23 136/251
2014/0150843 A1 6/2014 Pearce et al.
2014/0173997 A1 6/2014 Jenkins
2014/0179220 A1 6/2014 Railkar et al.
2014/0182222 A1 7/2014 Kalkanoglu et al.
2014/0208675 A1 7/2014 Beerer et al.
2014/0254776 A1 9/2014 O'Connor et al.
2014/0266289 A1 9/2014 Della Sera et al.
2014/0311556 A1 10/2014 Feng et al.
2014/0352760 A1 12/2014 Haynes et al.
2014/0366464 A1 12/2014 Rodrigues et al.
2015/0089895 A1 4/2015 Leitch
2015/0162459 A1 6/2015 Lu et al.
2015/0340516 A1 11/2015 Kim et al.
2015/0340990 A1* 11/2015 Kim .......................... E04D 1/18 136/251
2015/0349173 A1 12/2015 Morad et al.
2015/0354217 A1* 12/2015 Lucas ....................... E04D 1/30 52/747.1
2015/0354224 A1* 12/2015 Maurer ..................... E04D 1/12 52/302.1
2015/0354229 A1* 12/2015 Maurer ................. E04F 13/185 52/302.1
2015/0357965 A1* 12/2015 Akiba ..................... F24S 25/35 136/251
2015/0380588 A1* 12/2015 Lasich .................. H10F 19/904
2016/0105144 A1 4/2016 Haynes et al.
2016/0142008 A1 5/2016 Lopez et al.
2016/0164453 A1* 6/2016 Cropper .................. H02S 40/36 136/251
2016/0254776 A1 9/2016 Rodrigues et al.
2016/0276508 A1 9/2016 Huang et al.
2016/0359451 A1 12/2016 Mao et al.
2017/0159292 A1 6/2017 Chihlas et al.
2017/0179319 A1 6/2017 Yamashita et al.
2017/0179726 A1 6/2017 Garrity et al.
2017/0237390 A1 8/2017 Hudson et al.
2017/0331415 A1 11/2017 Koppi et al.
2018/0094438 A1 4/2018 Wu et al.
2018/0097472 A1 4/2018 Anderson et al.
2018/0115275 A1 4/2018 Flanigan et al.
2018/0254738 A1 9/2018 Yang et al.
2018/0294765 A1 10/2018 Friedrich et al.
2018/0351502 A1 12/2018 Almy et al.
2018/0367089 A1 12/2018 Stutterheim et al.
2019/0030867 A1 1/2019 Sun et al.
2019/0081436 A1 3/2019 Onodi et al.
2019/0123679 A1 4/2019 Rodrigues et al.
2019/0253022 A1 8/2019 Hardar et al.
2019/0305717 A1 10/2019 Allen et al.
2020/0109320 A1 4/2020 Jiang
2020/0144958 A1 5/2020 Rodrigues et al.
2020/0220819 A1 7/2020 Vu et al.
2020/0224419 A1 7/2020 Boss et al.
2020/0343397 A1 10/2020 Hem-Jensen
2021/0083619 A1 3/2021 Hegedus
2021/0115223 A1 4/2021 Bonekamp et al.
2021/0159353 A1 5/2021 Li et al.
2021/0301536 A1 9/2021 Baggs et al.
2021/0317662 A1* 10/2021 Svec ..................... E04D 1/2916
2021/0343886 A1 11/2021 Sharenko et al.
2022/0060141 A1 2/2022 Felton
2022/0149213 A1 5/2022 Mensink et al.
2022/0173691 A1* 6/2022 Atchley .................. H02S 30/00
2023/0178669 A1* 6/2023 Bettinelli ................ H10F 19/00 136/244
2024/0291427 A1 8/2024 Perkins et al.

FOREIGN PATENT DOCUMENTS

CN 202797032 U 3/2013
CN 217150978 U 8/2022
DE 1958248 A1 11/1971
EP 1039361 A1 9/2000
EP 1837162 A1 9/2007
EP 1774372 A1 7/2011
EP 2446481 A2 5/2012
EP 2784241 A1 10/2014
EP 3772175 A1 2/2021
JP 10046767 A 2/1998
JP 2002-106151 A 4/2002
JP 2001-098703 A 10/2002
JP 2017-027735 A 2/2017
JP 2018053707 A 4/2018
KR 20090084060 A 8/2009
KR 10-1348283 B1 1/2014
KR 10-2019-0000367 A 1/2019
KR 10-2253483 B1 5/2021
NL 2026856 B1 6/2022
WO 2010/151777 A2 12/2010
WO 2011/049944 A1 4/2011
WO 2015/133632 A1 9/2015
WO 2018/000589 A1 1/2018
WO 2019/201416 A1 10/2019
WO 2020-159358 A1 8/2020
WO 2021-247098 A1 12/2021

OTHER PUBLICATIONS

RGS Energy, 3.5kW Powerhouse 3.0 system installed in an afternoon; Jun. 7, 2019 <<facebook.com/RGSEnergy/>> retrieved Feb. 2, 2021.
Tesla, Solar Roof <<tesla.com/solarroof>> retrieved Feb. 2, 2021.
"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

ELECTRICALLY GROUNDING METAL ROOFING SHINGLES WITH PHOTOVOLTAIC SYSTEMS

CROSS-REFERENCE TO RELATED APPLICATION

This application is a Section 111(a) application relating to and claiming the benefit of commonly owned, co-pending U.S. Provisional Patent Application Ser. No. 63/674,050, filed Jul. 22, 2024, entitled "SYSTEMS AND METHODS OF ELECTRICALLY GROUNDING METAL ROOFING SHINGLES WITH PHOTOVOLTAIC SYSTEMS," the contents of which is incorporated herein by reference in its entirety.

FIELD

The present invention relates to roofing systems, and, more particularly, systems and methods for electrically grounding metal roofing shingles as part of a roofing systems including photovoltaic modules.

BACKGROUND

In known roofing systems, photovoltaic modules, which include at least one solar cell, and metal roofing shingles are installed on a roof deck.

SUMMARY

The Summary is a high-level overview of various aspects of the invention, and introduces some concepts that are further described in the Detailed Description below. The Summary is not intended to identify key or essential features of the disclosed subject matter, and also is not intended to be used in isolation to determine the scope of the disclosed subject matter. Instead, the disclosed subject matter should be understood by reference to appropriate portions of the Specification and drawings.

In some embodiments, a roofing system includes a roof deck; a plurality of photovoltaic modules installed on the roof deck, wherein each of the photovoltaic modules includes at least one solar cell; and a plurality of metal roofing shingles installed on the roof deck adjacent to the plurality of photovoltaic modules, wherein the plurality of metal roofing shingles includes at least a first metal roofing shingle, a second metal roofing shingle, and a third metal roofing shingle, wherein the first metal roofing shingle and the second metal roofing shingle are installed in a first row on the roof deck, wherein the third metal roofing shingle is installed in a second row on the roof deck, wherein the second row is adjacent the first row on the roof deck, wherein each of the metal roofing shingles includes a metal layer, wherein the metal layer includes a conductive metal, wherein the metal layer includes a side lap, wherein the side lap of the metal layer of the second metal roofing shingle overlays and is in electrical contact with the side lap of the metal layer of the first metal roofing shingle, to form a first grounding path, wherein the third metal roofing shingle is in electrical contact with the first metal roofing shingle, to form a second grounding path.

In some embodiments, each of the metal roofing shingles includes a cover layer, wherein the cover layer overlays at least a portion of the metal layer, and wherein the side lap is between an end of the metal layer and an end of the cover layer. In some embodiments, the first grounding path and the second grounding path are in electrical connection.

In some embodiments, the system further includes a plurality of fasteners, wherein the plurality of fasteners includes at least a first fastener and a second fastener, wherein the first fastener penetrates each of: the metal layer of the first metal roofing shingle, the metal layer of the second metal roofing shingle, and the roof deck, wherein the second fastener penetrates each of the metal layer of the first metal roofing shingle, the metal layer of the third metal roofing shingle, and the roof deck.

In some embodiments, the system further includes a plurality washers, wherein each of the washers includes a through hole, wherein the plurality of washers includes at least a first washer and a second washer, wherein the first washer is positioned between: the metal layer of the first metal roofing shingle, and the metal layer of the second metal roofing shingle, wherein the first fastener extends through the through hole of the first washer, wherein the second washer is positioned between: the metal layer of the first metal roofing shingle, and the metal layer of the third metal roofing shingle, wherein the second fastener extends through the through hole of the second washer.

In some embodiments, each of the washers includes corrugations, wherein the corrugations of the first washer are in contact with the metal layer of the first metal roofing shingle and the metal layer of the second metal roofing shingle, wherein the corrugations of the second washer are in contact with the metal layer of the first metal roofing shingle and the metal layer of the third metal roofing shingle.

In some embodiments, the system further includes a plurality of fasteners, wherein the plurality of fasteners includes at least a first fastener, a second fastener, and a third fastener, wherein each of the fasteners includes a fastener head, a fastener shaft extending from the fastener head, and at least one fastener barb extending from the fastener head, wherein the fastener shaft of the first fastener penetrates each of: the metal layer of the first metal roofing shingle, the metal layer of the second metal roofing shingle, and the roof deck, wherein the at least one fastener barb of the first fastener penetrates: the metal layer of the first metal roofing shingle, and the metal layer of the second metal roofing shingle, wherein the fastener shaft of the second fastener penetrates each of: the metal layer of the first metal roofing shingle, the metal layer of the third metal roofing shingle, and the roof deck, wherein the at least one fastener barb of the second fastener penetrates: the metal layer of the first metal roofing shingle, and the metal layer of the third metal roofing shingle.

In some embodiments, the system further includes a plurality of fasteners, wherein the plurality of fasteners includes at least a first fastener, a second fastener, and a third fastener, wherein each of the fasteners includes a fastener head, a fastener shaft extending from the fastener head, and at least one fastener barb extending from the fastener shaft, wherein the fastener shaft of the first fastener penetrates each of: the metal layer of the first metal roofing shingle, the metal layer of the second metal roofing shingle, and the roof deck, wherein the at least one fastener barb of the first fastener retains the metal layer of the first metal roofing shingle in contact with the metal layer of the second metal roofing shingle, wherein the fastener shaft of the second fastener penetrates each of: the metal layer of the first metal roofing shingle, the metal layer of the third metal roofing shingle, and the roof deck, wherein the at least one fastener barb of the second fastener retains the metal layer of the first metal roofing shingle in contact with the metal layer of the third metal roofing shingle.

In some embodiments, the system further includes a plurality of fasteners, wherein the plurality of fasteners includes at least a first fastener, wherein each of the metal roofing shingles comprise at least one cooperating feature, wherein the first fastener extends through: the at least one cooperating feature of the first metal roofing shingle, and the at least one cooperating feature of the second metal roofing shingle, so that the at least one cooperating feature of the first metal roofing shingle is engaged with the at least one cooperating feature of the second metal roofing shingle.

In some embodiments, each of the metal roofing shingles includes an adhesive, the roofing system includes a fastener, wherein the fastener penetrates the adhesive of at least one of the first metal roofing shingle or the second metal roofing shingle.

In some embodiments, a roofing system includes a roof deck; a plurality of photovoltaic modules installed on the roof deck, wherein each of the photovoltaic modules includes at least one solar cell; a plurality of metal roofing shingles installed on the roof deck adjacent to the plurality of photovoltaic modules, wherein the plurality of metal roofing shingles includes at least a first metal roofing shingle and a second metal roofing shingle, wherein the first metal roofing shingle is installed in a first row on the roof deck, wherein the second metal roofing shingle is installed in a second row on the roof deck, wherein the second row is adjacent the first row on the roof deck, wherein each of the metal roofing shingles includes a metal layer, wherein the metal layer includes a conductive metal material, wherein the metal layer includes an upper bend and a lower bend; and a plurality of clips, wherein the plurality of clips includes at least a first clip, wherein the first clip is in electrical contact with each of: the upper bend of the first metal roofing shingle, and the lower bend of the second metal roofing shingle, to form a first grounding path.

In some embodiments, each of the clips includes a first protrusion, wherein the first protrusion of the first clip is in contact with the upper bend of the first metal roofing shingle, and a second protrusion, wherein the second protrusion of the first clip is in contact with the lower bend of the second metal roofing shingle.

In some embodiments, the system further includes a plurality of fasteners, wherein the plurality of fasteners includes at least a first fastener and a second fastener, wherein the first fastener penetrates the first metal roofing shingle and the roof deck, wherein the second fastener penetrates the second metal roofing shingle and the roof deck.

In some embodiments, the plurality of metal roofing shingles further includes at least a third metal roofing shingle, wherein the plurality of clips further includes a second clip, wherein the roofing system further includes a connector, wherein the third metal roofing shingle is installed in the first row of the roof deck, adjacent to the first metal roofing shingle, wherein the second clip contacts the upper bend of the third metal roofing shingle, to form a second grounding path, wherein the connector is in connection with the first clip and the second clip, to form a third grounding path.

In some embodiments, the system further includes a plurality of fasteners, wherein the plurality of fasteners includes at least a first fastener and a second fastener, wherein the first fastener penetrates the upper bend of the first metal roofing shingle and the roof deck, wherein the second fastener penetrates the upper bend of the second metal roofing shingle and the roof deck.

In some embodiments, a method includes obtaining a photovoltaic module and a plurality of metal roofing shingles, wherein the photovoltaic module includes at least one solar cell, wherein the plurality of metal roofing shingles includes at least a first metal roofing shingle, a second metal roofing shingle, and a third metal roofing shingle, wherein each of the metal roofing shingles includes a metal layer, wherein the metal layer includes a conductive metal material, wherein the metal layer includes a side lap; installing the photovoltaic module on a roof deck; installing the first metal roofing shingle in a first row on the roof deck, adjacent to the photovoltaic module; installing the second metal roofing shingle in the first row on the roof deck, adjacent to the first metal roofing shingle, wherein the side lap of the metal layer of the second metal roofing shingle overlays and is in electrical contact with the side lap of the metal layer of the first metal roofing shingle, to form a first grounding path; and installing the third metal roofing shingle in a second row on the roof deck, wherein the second row is adjacent the first row on the roof deck, wherein the third metal roofing shingle is in electrical contact with the first metal roofing shingle, to form a second grounding path.

In some embodiments, the first grounding path is in electrical connection with the second grounding path.

In some embodiments, the installing the first metal roofing shingle includes penetrating, with a first fastener, each of: the metal layer of the first metal roofing shingle, the metal layer of the second metal roofing shingle, and the roof deck.

In some embodiments, the method further includes obtaining a washer, wherein the washer includes a through hole, wherein the installing the second metal roofing shingle includes positioning a washer between the metal layer of the first metal roofing shingle, and the metal layer of the second metal roofing shingle; and disposing a fastener through each of: the metal layer of the first metal roofing shingle, the metal layer of the second metal roofing shingle, the through hole of the washer, and the roof deck.

In some embodiments, the method further includes obtaining a fastener, wherein the fastener includes a fastener head, a fastener shaft extending from the fastener head, and at least one fastener barb extending from the fastener head; wherein the installing the second metal roofing shingle includes penetrating, with the fastener shaft of the fastener, each of: the metal layer of the first metal roofing shingle, the metal layer of the second metal roofing shingle, and the roof deck; and penetrating, with the at least one fastener barb of the fastener, each of: the metal layer of the first metal roofing shingle, and the metal layer of the second metal roofing shingle.

In some embodiments, the method further includes obtaining a fastener, wherein the fastener includes a fastener head, a fastener shaft extending from the fastener head, and at least one fastener barb extending from the fastener shaft; wherein the installing the second metal roofing shingle includes penetrating, with the fastener shaft of the fastener, each of: the metal layer of the first metal roofing shingle, the metal layer of the second metal roofing shingle, and the roof deck; and urging toward one another, with the at least one fastener barb of the fastener, each of: the metal layer of the first metal roofing shingle, and the metal layer of the second metal roofing shingle.

In some embodiments, the method further includes obtaining a fastener, wherein the fastener includes a fastener head, a fastener shaft extending from the fastener head, and at least one fastener barb extending from the fastener shaft; wherein the installing the second metal roofing shingle includes penetrating, with the fastener shaft of the fastener, each of: the metal layer of the first metal roofing shingle, the metal layer of the second metal roofing shingle, and the roof deck; and urging toward one another, with the at least one fastener barb of the fastener, each of: the metal layer of the first metal roofing shingle, and the metal layer of the second metal roofing shingle.

In some embodiments, each of the metal roofing shingles includes at least one cooperating feature, wherein the installing the second metal roofing shingle includes installing a fastener through each of: the at least one cooperating feature of the first metal roofing shingle, and the at least one cooperating feature of the second metal roofing shingle, so that the at least one cooperating feature of the first metal roofing shingle is engaged with a corresponding one of the at least one cooperating feature of the second metal roofing shingle.

In some embodiments, a method includes obtaining a photovoltaic module, a plurality of metal roofing shingles, and a plurality of clips, wherein the photovoltaic module includes at least one solar cell; wherein the plurality of metal roofing shingles includes at least a first metal roofing shingle and a second metal roofing shingle, wherein each of the metal roofing shingles includes a metal layer, wherein the metal layer includes a conductive metal, wherein the metal layer includes an upper bend and a lower bend, wherein the plurality of clips includes at least a first clip; installing the photovoltaic module on a roof deck; installing the first metal roofing shingle in a first row on the roof deck, adjacent to the photovoltaic module; installing the first clip in the upper bend of the first metal roofing shingle, such that the first clip is in electrical contact with the upper bend, to form a first grounding path; and installing the second metal roofing shingle in a second row on the roof deck, such that the first clip is in electrical contact with the lower bend of the second metal roofing shingle, to form a second grounding path, wherein the second row is adjacent the first row on the roof deck.

In some embodiments, each of the clips includes a first protrusion, and a second protrusion, wherein the installing the first clip includes installing the first clip in the upper bend of the first metal roofing shingle such that the first protrusion of the first clip is in electrical contact with the upper bend of the first metal roofing shingle, wherein the installing the second metal roofing shingle includes installing the second metal roofing shingle such that the lower bend of the second metal roofing shingle is in electrical contact with the second protrusion.

In some embodiments, the installing the first metal roofing shingle further includes penetrating each of the first metal roofing shingle and the roof deck with a first fastener, wherein the installing the second metal roofing shingle further includes penetrating each of the second metal roofing shingle and the roof deck with a second fastener.

In some embodiments, the plurality of metal roofing shingles further includes at least a third metal roofing shingle, wherein the plurality of clips further includes a second clip, wherein the method further includes obtaining a connector; installing the third metal roofing shingle in the first row of the roof deck, adjacent the first metal roofing shingle, to form a third grounding path; installing the second clip in the upper bend of the third metal roofing shingle, to form a fourth grounding path; and installing the connector to connect the first clip in the first metal roofing shingle and the second clip in the third metal roofing shingle, to form a fifth grounding path.

In some embodiments, the method further includes obtaining a plurality of fasteners, wherein the plurality of fasteners includes at least a first fastener and a second fastener, wherein the installing the first metal roofing shingle further includes penetrating, with the first fastener, the upper bend of the first metal roofing shingle and the roof deck, wherein the installing the second metal roofing shingle further includes penetrating, with the second fastener, the upper bend of the second metal roofing shingle and the roof deck.

BRIEF DESCRIPTION OF THE DRAWINGS

This section refers to the drawings that form a part of this disclosure, and which illustrate some of the embodiments of structure, materials, and/or methods of the present invention described herein.

DETAILED DESCRIPTION

In addition to the benefits and improvements that the Specification discloses, other objects and advantages that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

As used herein, a "steep slope" roof or roof deck is a roof or roof deck that has a pitch of Y/X, where Y and X are in a ratio of 4:12 to 20:12, where Y corresponds to the "rise" of the roof or roof deck, and where X corresponds to the "run" of the roof or roof deck.

As used herein, a "sloped" roof or roof deck is a roof or roof deck that has a pitch greater than zero (the roof or roof deck is not flat), but the pitch is less than that of a steep slope roof or roof deck.

Figure 2:
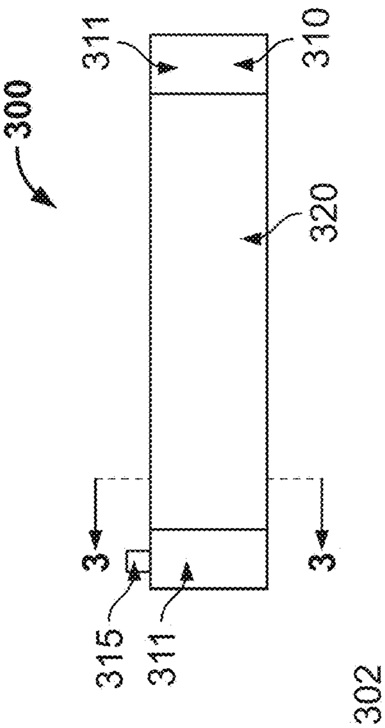
FIG. 2 is a schematic top view of one of the metal roofing shingles of FIG. 1, in accordance with some embodiments of the invention.
Figure 3:
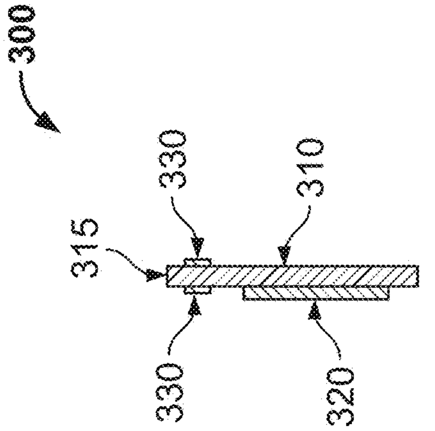
FIG. 3 is a schematic cross-sectional view of the metal roofing shingle taken along line Ill-Ill in FIG. 2, in accordance with some embodiments of the invention.
Figure 1:
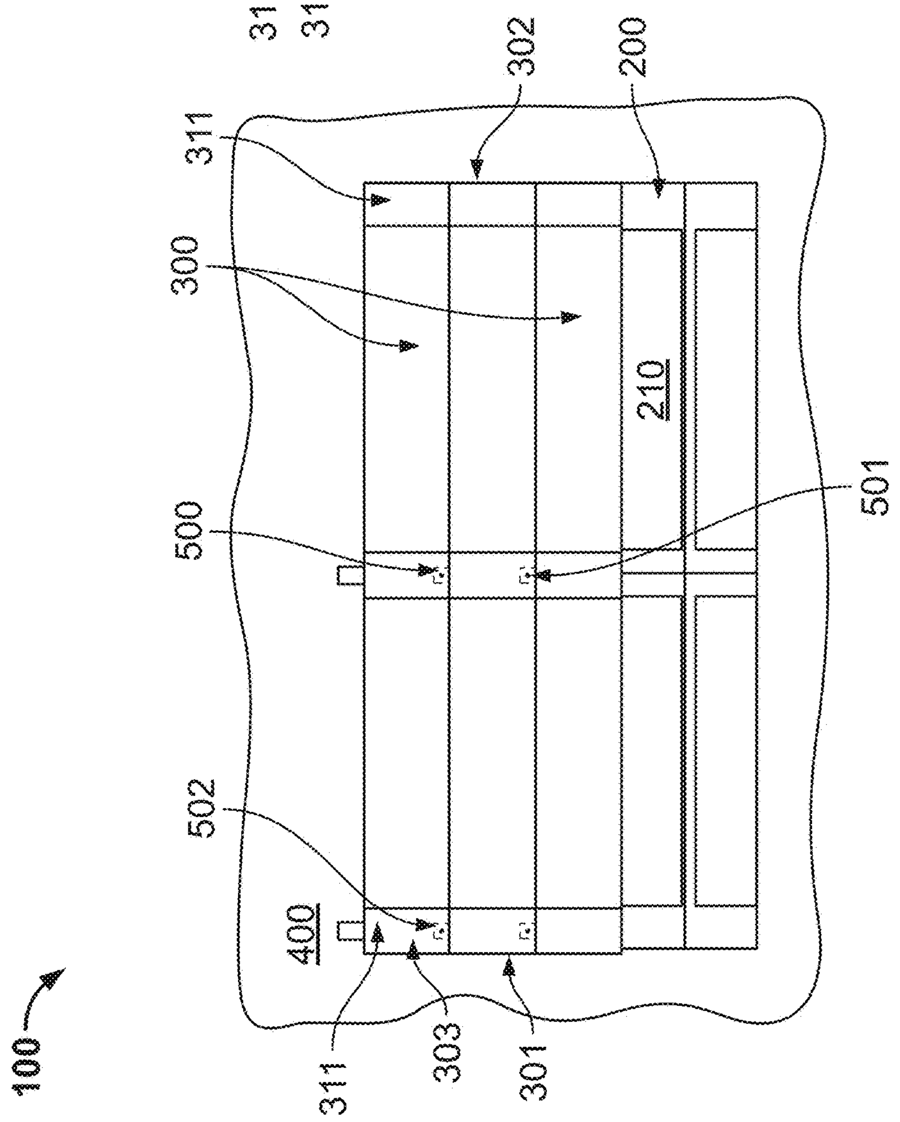
FIG. 1 is a schematic top view of a roofing system including a plurality of photovoltaic modules as well as a plurality of metal roofing shingles installed on a roof deck, in accordance with some embodiments of the invention.

With reference to the drawings, FIG. 1 is a schematic top view of a roofing system 100 including a plurality of photovoltaic modules 200 as well as a plurality of metal roofing shingles 300 installed on a roof deck 400 by a plurality of fasteners 500; FIG. 2 is a schematic top view of one of the metal roofing shingles 300 of FIG. 1; and FIG. 3 is a schematic cross-sectional view of the metal roofing shingle 300 taken along line III-III in FIG. 2, in accordance with some embodiments of the invention. In some embodiments, as FIG. 1 shows, the plurality of metal roofing shingles 300 is installed on the roof deck 400 adjacent to the plurality of photovoltaic modules 200. Although FIG. 1 shows the photovoltaic modules 200 and the metal roofing shingles 300 installed in rectangular arrays, in some embodiments, either or both of the photovoltaic modules 200 and/or the metal roofing shingles 300 are installed in an offset/staggered configuration, in which joints or seams between adjacent photovoltaic modules 200 and/or metal roofing shingles 300 in a same row on the roof deck 400 are not aligned with the joints or seams between adjacent photovoltaic modules 200 and/or metal roofing shingles 300 in a row that is directly above or directly below that row on the roof deck 400.

In some embodiments, FIG. 1 shows, each of the photovoltaic modules 200 includes at least one solar cell 210. In some embodiments, one or more of the photovoltaic modules 200 includes a structure, composition, component, and/or function, except as otherwise described or shown herein, similar to those of one or more embodiments of the photovoltaic modules and photovoltaic shingles as disclosed, shown, and/or described in any or all of: U.S. application Ser. No. 17/831,307, filed Jun. 2, 2022, titled "Roofing Module System," and published under U.S. Patent Application Publication No. 2022-0393637 on Dec. 8, 2022; U.S. application Ser. No. 18/169,718, filed Feb. 15, 2023, titled "Roofing Module System," and published under U.S. Patent Application Publication No. 2023-0203815 on Jun. 29, 2023; U.S. Pat. No. 11,870,227, issued Jan. 9, 2024, entitled "Building Integrated Photovoltaic System," owned by GAF Energy LLC,; and/or U.S. Pat. No. 11,251,744 to Bunea et al., issued Feb. 15, 2022, titled "Photovoltaic Shingles and Methods of Installing Same"; and the disclosures of each of which are incorporated by reference herein in their entireties, with certain different and/or additional features as described herein.

As FIG. 1 shows, in some embodiments, the plurality of metal roofing shingles 300. In some embodiments, one or more of the metal roofing shingles 300 includes a structure, composition, component, and/or function, except as otherwise described or shown herein, similar to those of one or more embodiments of the metal roofing shingles and/or panels as disclosed, shown, and/or described in either or both of U.S. Pat. No. 11,603,660 to Anderson et al., issued Mar. 14, 2023, titled "Steep Slope Roofing Panel System and Method," and/or U.S. Pat. No. 11,566,426 to Boss et al., issued Jan. 31, 2023, titled "Roofing Panels with Water Shedding Features," and the disclosures of each of which are incorporated by reference herein in their entireties, with certain different and/or additional features as described herein.

In some embodiments, the plurality of metal roofing shingles 300 includes at least a first metal roofing shingle 301, a second metal roofing shingle 302, and a third metal roofing shingle 303. It is understood, however, that in some embodiments, the roofing system 100 includes a greater number or a lesser number of photovoltaic modules 200 and/or metal roofing shingles 300 than FIG. 1 shows and/or as described herein. In some embodiments, as FIG. 1 shows, the first metal roofing shingle 301 and the second metal roofing shingle 302 are installed in a first row on the roof deck 400. In some embodiments, as FIG. 1 shows, the third metal roofing shingle 303 is installed in a second row on the roof deck 400. In some embodiments, the second row is adjacent the first row on the roof deck 400. In some embodiments, adjacent rows are rows that are vertically adjacent to one another on the roof deck 400, such that one row is immediately above or below another row on the roof deck 400.

In some embodiments, as FIGS. 2 and 3 show, the metal roofing shingles 300 include a metal layer 310. In some embodiment, each of the metal roofing shingles 300 includes a cover layer 320. In some embodiments, the metal layer 310 includes a conductive metal. In some embodiments, the cover layer 320 overlays a portion of the metal layer 310, thereby exposing at least one side lap 311 of the metal layer 310. In some embodiments, the cover layer 320 overlays a portion of the metal layer 310, thereby exposing two side laps 311 of the metal layer 310. In some embodiments, the cover layer 320 is electrically non-conductive. In some embodiments, the cover layer 320 includes one or more of a polymer, a paint, or a non-electrically conductive metal and/or other material.

As FIG. 1 shows, in some embodiments, one of the side laps 311 of the metal layer 310 of the second metal roofing shingle 302 overlays and is in electrical contact with the side lap 311 of the metal layer 310 of the first metal roofing shingle 301, to form a first grounding path. In some embodiments, the first grounding path is between metal roofing shingles 300 installed in the same row on the roof deck 400. In some embodiments, as the figure also shows, the third metal roofing shingle 303 is in electrical contact with the first metal roofing shingle 301, to form a second grounding path. In some embodiments, the first grounding path and the second grounding path are in electrical connection, thereby grounding the first metal roofing shingle 301, the second metal roofing shingle 302, and the third metal roofing shingle 303.

As FIG. 1 shows, in some embodiments, the roofing system 100 includes the plurality of fasteners 500. In some embodiments, the plurality of fasteners 500 includes at least a first fastener 501 and a second fastener 502. In some embodiments, the first fastener 501 penetrates each of the metal layer 310 of the first metal roofing shingle 301, the metal layer 310 of the second metal roofing shingle 302, and the roof deck 400. In some embodiments, the second fastener 502 penetrates each of the metal layer 310 of the first metal roofing shingle 301, the metal layer 310 of the third metal roofing shingle 303, and the roof deck 400. In some embodiments, one or more of the fasteners 500, such as but not limited to the first fastener 501 and/or the second fastener 502, form one or more portions of one or more grounding paths between the metal roofing shingles 300. In some embodiments, one or more fasteners 500 penetrate the side laps 311 of the metal roofing shingles 300.

As shown in FIGS. 1-3, in some embodiments, the metal roofing shingle 300 includes an adhesive 330. In some embodiments, the fastener 500 penetrates the adhesive 330 of the metal roofing shingle 300. In some embodiments, the adhesive 330 at least partially seals the hole formed in the metal roofing shingle 300 by the fastener 500. In some embodiments, the adhesive 330 includes a butyl adhesive. In some embodiments, the metal roofing shingle 300 includes a tab 315. In some embodiments, the tab 315 is a part of the metal layer 310, and includes the conductive metal material of the metal layer 310. In some embodiments, the tab 315 forms a portion of a grounding path between metal roofing shingles 300. In some embodiments, one or more of the adhesives 330 are on top or bottom surfaces of the tab 315, as FIG. 3 shows. In some embodiments, one of more of the fasteners 500 penetrate the tab 315 of the metal roofing shingle 300 when the metal roofing shingle 300 is installed on the roof deck 400.

Figure 4:
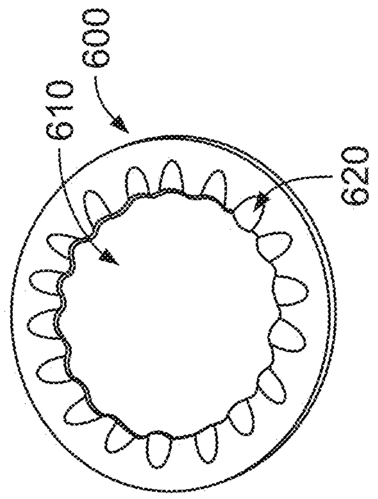
FIG. 4 is a schematic top view of a washer employed by a roofing system, in accordance with some embodiments of the invention.
Figure 5:
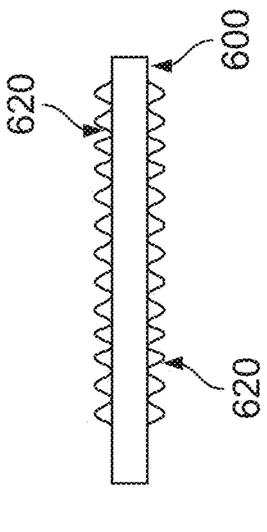
FIG. 5 is a schematic side view of the washer of FIG. 4, in accordance with some embodiments of the invention.

FIG. 4 is a schematic top view of a washer 600 of the roofing system 100, and FIG. 5 is a schematic side view of the washer 600 of FIG. 4, in accordance with some embodiments of the invention. In some embodiments, the roofing system 100 includes a plurality of washers 600. In some embodiments, the washers 600 include electrically conductive materials. In some embodiments, as FIG. 4 shows, the washers 600 include through holes 610. In some embodiments, a first one of the washers 600 is positioned between the metal layer 310 of the first metal roofing shingle 301, and the metal layer 310 of the second metal roofing shingle 302. In some embodiments, the first fastener 501 extends through the through hole 610 of the first one of the washers 600. In some embodiments, the second one of the washers 600 is positioned between the metal layer 310 of the first metal roofing shingle 301, and the metal layer 310 of the third metal roofing shingle 303, and the second fastener 502 extends through the through hole 610 of the second one of the washers 600. In some embodiments, the washers 600 form one or more portions of one or more grounding paths between the metal roofing shingles 300.

In some embodiments, as FIGS. 4 and 5 show, the washers 600 includes one or more corrugations 620, such as corrugated top and/or bottom surfaces. In some embodiments, the washers 600 are disposed between the metal roofing shingles 300, such that the corrugations 620 of the washers 600 are in contact with the metal layers 310 of the metal roofing shingles 300. Thus, for example, in some embodiments, the top surface of the washer 600 is in contact with a bottom surface of the metal roofing shingle 300, and, in some embodiments, the bottom surface of the washer 600 is in contact with the top surface of another metal roofing shingle 300. In some embodiments, the corrugations 620 of the first one of the washers 600 are in contact with the metal layer 310 of the first metal roofing shingle 301 and the metal layer 310 of the second metal roofing shingle 302. In some embodiments, corrugations 620 of the second one of the washers 600 are in contact with the metal layer 310 of the first metal roofing shingle 301 and the metal layer 310 of the third metal roofing shingle 303. In some embodiments, the corrugations 620 extend through any oxidation on surfaces of the metal layers 310 of the metal roofing shingles 300 and thus contact an unoxidized, electrically-conductive material of the metal layer 310, such that the corrugations 620 and the washers 600 form one or more portions of one or more grounding paths between the metal roofing shingles 300.

In some embodiments, one or more of the upper and lower surfaces of the washers 600 omits the corrugations 620. In some embodiments, one or more of the surfaces of the washers 600 includes a greater or lesser number of the corrugations 620 than shown. In some embodiments, one or more of the corrugations 620 has a different shape than shown.

Figure 6:
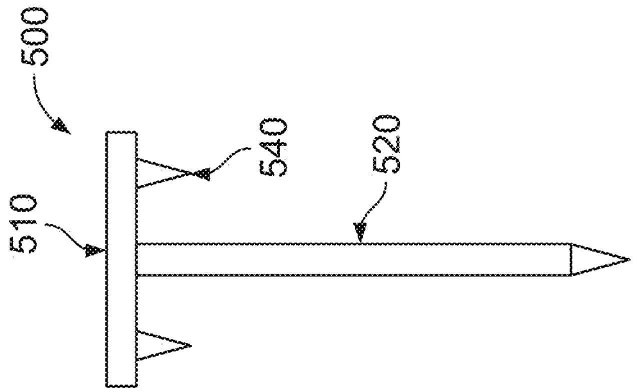
FIG. 6 is a schematic side view of a fastener employed by a roofing system, in accordance with some embodiment of the invention.

FIG. 6 is a schematic side view of one of the fasteners 500, in accordance with some embodiment of the invention. As FIG. 6 shows, in some embodiments, the fastener 500 includes a fastener head 510, a fastener shaft 520 extending from the fastener head 510, and one or more than one fastener barb 540 extending from the underside of the fastener head 510. In some embodiments, when the fasteners 500 including the fastener barbs 540 are used to install the metal roofing shingles 300 on the roof deck 400, the fastener barbs 540 extend through the metal layers 310 of the metal roofing shingle 300. Thus, in some embodiments, when the first fastener 501 is the embodiment shown in FIG. 6, the fastener shaft 520 of the first fastener 501 penetrates each of the metal layer 310 of the first metal roofing shingle 301, the metal layer 310 of the second metal roofing shingle 302, and the roof deck 400; and the one or more than one fastener barb 540 of the first fastener 501 penetrates the metal layer 310 of the first metal roofing shingle 301, and the metal layer 310 of the second metal roofing shingle 302. In some embodiments, when the second fastener 502 is the embodiment shown in FIG. 6, the fastener shaft 520 of the second fastener 502 penetrates each of the metal layer 310 of the first metal roofing shingle 301, the metal layer 310 of the third metal roofing shingle 303, and the roof deck 400; and the one or more than one fastener barb 540 of the second fastener 502 penetrates the metal layer 310 of the first metal roofing shingle 301, and the metal layer 310 of the third metal roofing shingle 303. In some embodiments, the fastener barbs 540 further secure the metal roofing shingles 300 to one another and/or to the roof deck 400. In some embodiments, the fastener barbs 540 form one or more portions of one or more grounding paths between the metal roofing shingles 300. In some embodiments, fastener barbs 540 extend through the metal layers 310 of the metal roofing shingles 300 without extending into the roof deck 400.

Figure 7:
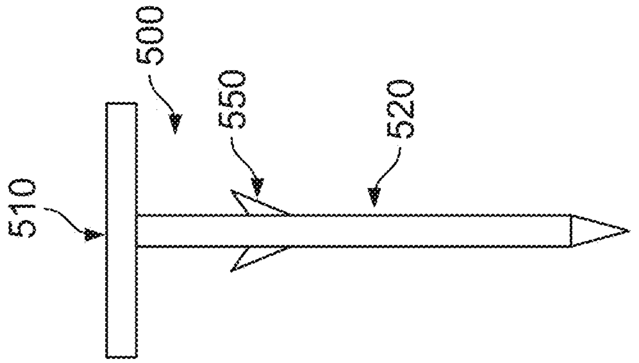
FIG. 7 is a schematic side view of a fastener employed by a roofing system, in accordance with some embodiment of the invention.

FIG. 7 is a schematic side view of one of the fasteners 500, in accordance with some embodiment of the invention. As FIG. 7 shows, in some embodiments, the fastener 500 includes a fastener head 510, a fastener shaft 520 extending from the fastener head 510, and one or more than one fastener barb 550 extending from the outer surface of the fastener shaft 520. In some embodiments, when the fasteners 500 including the fastener barbs 550 are used to install the metal roofing shingles 300 on the roof deck 400, the fastener barbs 550 urge, push, or retain the metal layers 310 of the metal roofing shingle 300 into contact with one another. Thus, in some embodiments, when the first fastener 501 is the embodiment shown in FIG. 6, the fastener shaft 520 of the first fastener 501 penetrates each of the metal layer 310 of the first metal roofing shingle 301, the metal layer 310 of the second metal roofing shingle 302, and the roof deck 400. In some embodiments, the one or the more than one fastener barb 550 of the first fastener 501 retains the metal layer 310 of the first metal roofing shingle 301 in contact with the metal layer 310 of the second metal roofing shingle 302. In some embodiments, the one or the more than one fastener barb 550 of the first fastener 501 urges, pushes, or retains the metal layer 310 of the first metal roofing shingle 301 toward and/or in contact with the metal layer 310 of the second metal roofing shingle 302. In some embodiments, when the second fastener 502 is the embodiment shown in FIG. 6, the fastener shaft 520 of the second fastener 502 penetrates each of the metal layer 310 of the first metal roofing shingle 301, the metal layer 310 of the third metal roofing shingle 303, and the roof deck 400. In some embodiments, the one or the more than one fastener barb 550 of the second fastener 502 urges, pushes, or retains the metal layer 310 of the first metal roofing shingle 301 toward and/or in contact with the metal layer 310 of the third metal roofing shingle 303.

In some embodiments, one or more of the fasteners 500 omits the fastener barbs 540 and/or the fastener barbs 550. In some embodiments, one or more of the fasteners 500 includes a greater or lesser number of the fastener barbs 540 and/or the fastener barbs 550 than shown. In some embodiments, one or more of the fastener barbs 540 and/or the fastener barbs 550 has a different shape than shown. In some embodiments, one or more of the fasteners 500 includes one or more of the fastener barbs 540 and one or more of the fastener barbs 550.

Figure 8:
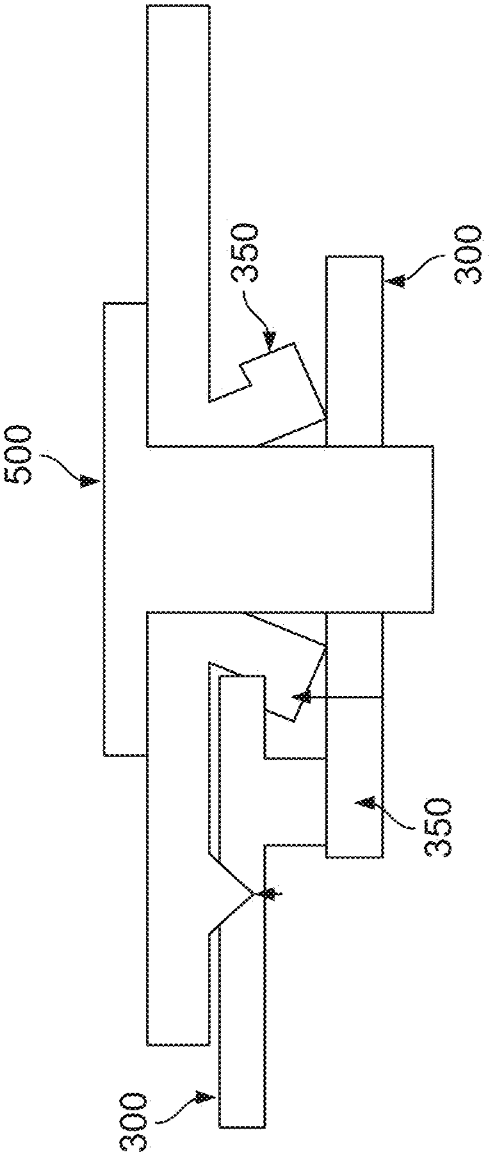
FIG. 8 is a schematic cross-sectional view of portions of the metal roofing shingles, in accordance with some embodiments of the invention.

FIG. 8 is a schematic cross-sectional view of portions of the metal roofing shingles 300, in accordance with some embodiments of the invention. As FIG. 8 shows, in some embodiments, the metal roofing shingles 300 include one or more cooperating features 350. In some embodiments, the fastener 500 extends through the cooperating feature 350 in two metal roofing shingles 300, such that the cooperating features 350 are brought into engagement with one another and thereby securing the metal roofing shingles 300 to one another. Thus, in some embodiments, the fastener 501 extends through the cooperating feature 350 of the first metal roofing shingle 301, and the cooperating feature 350 of the second metal roofing shingle 302, so that the cooperating feature 350 of the first metal roofing shingle 301 is engaged with the cooperating feature 350 of the second metal roofing shingle 302. In some embodiments, the cooperating features 350 form one or more portions of one or more grounding paths between the metal roofing shingles 300.

Figure 10:
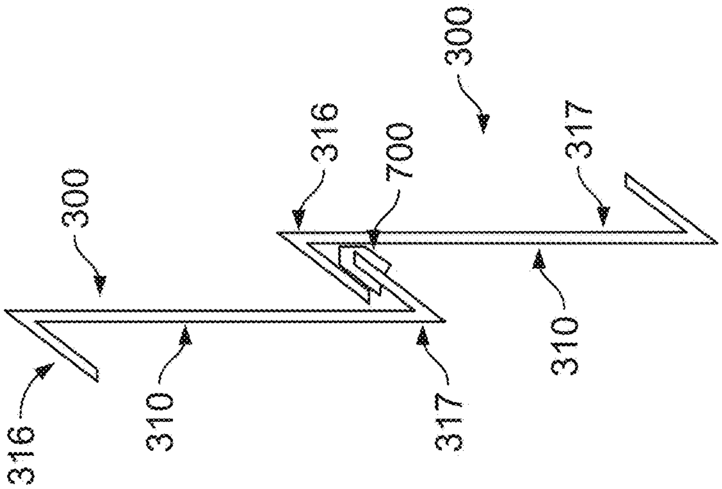
FIG. 10 is a schematic cross-sectional view of the metal roofing shingle taken along line X-X in FIG. 9, in accordance with some embodiments of the invention.
Figure 9:
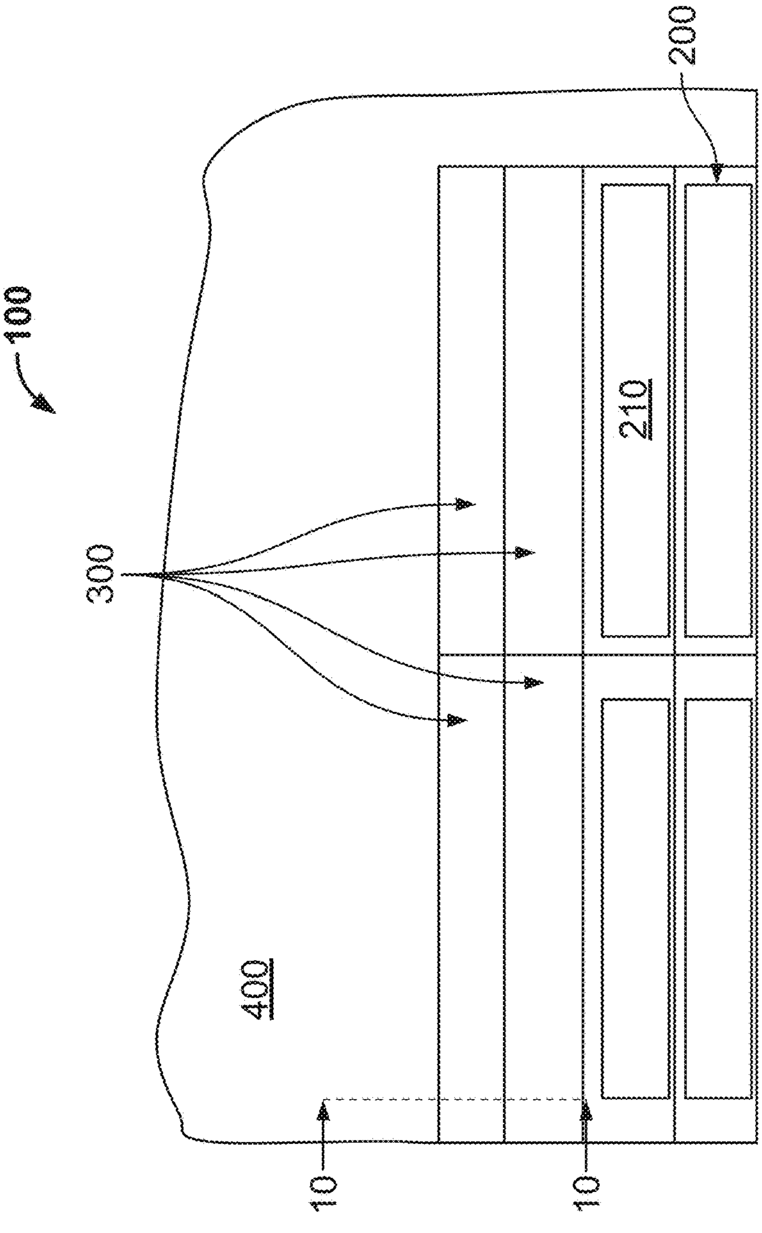
FIG. 9 is a schematic top view of the roofing system including the plurality of photovoltaic modules as well as the plurality of metal roofing shingles installed on the roof deck, in accordance with some embodiments of the invention.

FIG. 9 is a schematic top view of the roofing system 100 including the plurality of photovoltaic modules 200 as well as the plurality of metal roofing shingles 300 installed on the roof deck 400, and FIG. 10 is a schematic cross-sectional view of the metal roofing shingle 300 taken along line X-X in FIG. 9, in accordance with some embodiments of the invention. In some embodiments, as FIG. 9 shows, the plurality of metal roofing shingles 300 are installed on the roof deck 400 adjacent to the plurality of photovoltaic modules 200. Although FIG. 9 shows the photovoltaic modules 200 and the metal roofing shingles 300 installed in rectangular arrays, in some embodiments, either or both of the photovoltaic modules 200 and/or the metal roofing shingles 300 are installed in an offset/staggered configuration, in which joints or seams between adjacent photovoltaic modules 200 and/or metal roofing shingles 300 in the same row are not aligned with the joints or seams between adjacent between adjacent photovoltaic modules 200 and/or metal roofing shingles 300 in the row that is directly above or directly below that row on the roof deck 400.

In some embodiments, the metal roofing shingle 300 includes the metal layer 310. As FIGS. 9 and 10 show, in some embodiments, the metal layer 310 includes an upper bend 316 and a lower bend 317. As FIG. 10 shows, in some embodiments, the upper bend 316 of the metal roofing shingle 300 in a lower row on the roof deck 400 is positioned within the lower bend 317 of the metal roofing shingle 300 in a higher row on the roof deck 400. In some embodiments, the roofing system 100 includes one or more than one clip 700 disposed between the upper bend 316 of the metal roofing shingle 300 in the lower row and the lower bend 317 of the metal roofing shingle 300 in the higher row. In some embodiments, the clip 700 includes a metal material. In some embodiments, the metal material is a conductive metal. In some embodiments, the clip 700 forms one or more portions of one or more grounding paths between the metal roofing shingles 300.

Figure 11:
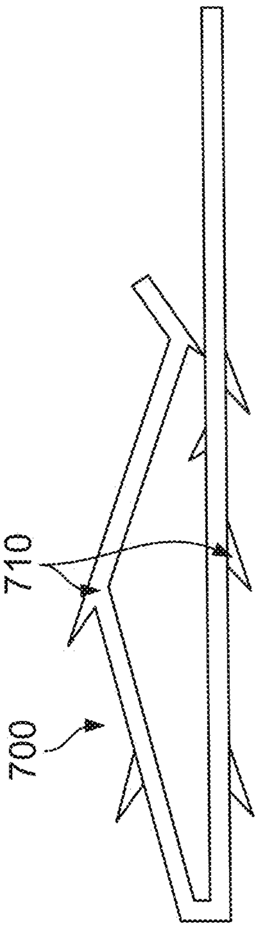
FIG. 11 is a schematic cross-sectional view of a clip employed by a roofing system, in accordance with some embodiments of the invention.

FIG. 11 is a schematic cross-sectional view of the clip 700, in accordance with some embodiments of the invention. As FIG. 11 shows, in some embodiments, the clips 700 includes one or more protrusions 710. In some embodiments, the protrusions are in contact with the upper bend 316 and/or the lower bend 317 of the metal roofing shingle 300. Thus, in some embodiments, the protrusions 710 retain the clip 700 in its position, retain the clip 700 in contact with the upper bend 316 and/or the lower bend 317, and/or form one or more portions of one or more grounding paths between the metal roofing shingles 300. In some embodiments, one or more of the surfaces of the clips 700 omit the protrusions 710. In some embodiments, one or more of the surfaces of the clips 700 include a greater or lesser number of the protrusions 710 than shown. In some embodiments, one or more of the protrusions 710 has a different shape than shown.

Figure 13:
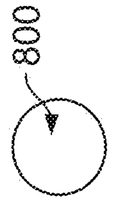
FIG. 13 is a schematic side view of the connector of FIG. 12, in accordance with some embodiments of the invention.
Figure 14:
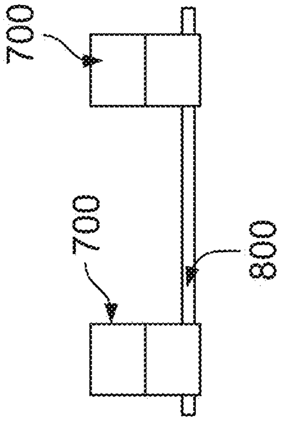
FIG. 14 is a schematic top view of two clips 700 connected by connector 800, in accordance with some embodiments of the invention.
Figure 12:
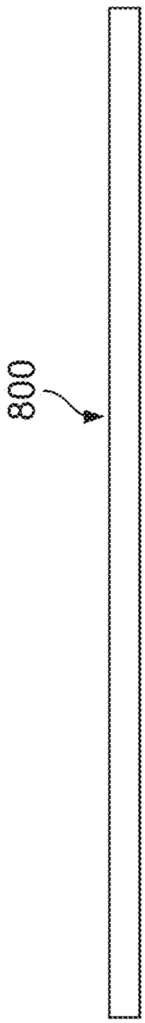
FIG. 12 is a schematic top view of a connector, in accordance with some embodiments of the invention.

FIG. 12 is a schematic top view of a connector 800, and FIG. 13 is a schematic side view of the connector 800, and FIG. 14 is a schematic top view of two clips 700 connected by connector 800, in accordance with some embodiments of the invention. As FIGS. 12-14 show, in some embodiments, the connector 800 is a bar. In some embodiments, the connector 800 is a conductive material. In some embodiments, the connector 800 connects clips 700 within a same row on the roof deck 400. In some embodiments, the roofing system 100 includes a plurality of connectors 800 connecting clips 700 to one another. Thus, in some embodiments, the clips 700 are installed in different ones of the metal roofing shingles 300 that are installed in the same row on the roof deck 400, and the connector 800 forms one or more portions of one or more grounding paths between the metal roofing shingles 300 in the same row on the roof deck 400.

Variations, modifications, and alterations to embodiments of the present disclosure described above will make themselves apparent to those skilled in the art. All such variations, modifications, alterations and the like are intended to fall within the spirit and scope of the present disclosure. While several embodiments of the present disclosure have been described, it is understood that these embodiments are illustrative only, and not restrictive, and that many modifications may become apparent to those of ordinary skill in the art. Any feature or element that is positively identified in this description may also be specifically excluded as a feature or element of an embodiment of the present. The disclosure described herein may be practiced in the absence of any element or elements, limitation or limitations, which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. A roofing system, comprising:

a roof deck;

a plurality of photovoltaic modules installed on the roof deck, wherein each of the plurality of photovoltaic modules includes at least one solar cell; and a plurality of metal roofing shingles installed on the roof deck adjacent to the plurality of photovoltaic modules, wherein the plurality of metal roofing shingles includes at least a first metal roofing shingle, a second metal roofing shingle, and a third metal roofing shingle, wherein the first metal roofing shingle and the second metal roofing shingle are installed in a first row on the roof deck, wherein the third metal roofing shingle is installed in a second row on the roof deck, wherein the second row is adjacent the first row on the roof deck, wherein each of the plurality of metal roofing shingles includes a metal layer, wherein the metal layer includes a conductive metal, wherein the metal layer includes a side lap, wherein the side lap of the metal layer of the second metal roofing shingle overlays and is in electrical contact with the side lap of the metal layer of the first metal roofing shingle, to form a first grounding path, wherein the third metal roofing shingle is in electrical contact with the first metal roofing shingle, to form a second grounding path; and a plurality of fasteners, wherein the plurality of fasteners includes at least a first fastener and a second fastener, wherein the first fastener penetrates each of:

the metal layer of the first metal roofing shingle, the metal layer of the second metal roofing shingle, and the roof deck, wherein the second fastener penetrates each of:

the metal layer of the first metal roofing shingle, the metal layer of the third metal roofing shingle, and the roof deck;

a plurality of washers, wherein each of the plurality of washers includes a through hole, wherein the plurality of washers includes at least a first washer and a second washer, wherein the first washer is positioned between:

the metal layer of the first metal roofing shingle, and the metal layer of the second metal roofing shingle, wherein the first fastener extends through the through hole of the first washer wherein the second washer is positioned between:

the metal layer of the first metal roofing shingle, and the metal layer of the third metal roofing shingle, wherein the second fastener extends through the through hole of the second washer.

2. The roofing system of claim 1, wherein the first grounding path and the second grounding path are in electrical connection.

3. The roofing system of Claim 1, wherein each of the plurality of washers includes corrugations, wherein the corrugations of the first washer are in contact with the metal layer of the first metal roofing shingle and the metal layer of the second metal roofing shingle, wherein the corrugations of the second washer are in contact with the metal layer of the first metal roofing shingle and the metal layer of the third metal roofing shingle.

4. The roofing system of claim 1, wherein each of the plurality of fasteners includes:

a fastener head, a fastener shaft extending from the fastener head, and at least one fastener barb extending from the fastener shaft, wherein the fastener shaft of the first fastener penetrates each of:

the metal layer of the first metal roofing shingle, the metal layer of the second metal roofing shingle, and the roof deck, wherein the at least one fastener barb of the first fastener retains the metal layer of the first metal roofing shingle together with the metal layer of the second metal roofing shingle, wherein the fastener shaft of the second fastener penetrates each of:

the metal layer of the first metal roofing shingle, the metal layer of the third metal roofing shingle, and the roof deck, wherein the at least one fastener barb of the second fastener retains the metal layer of the first metal roofing shingle together with the metal layer of the third metal roofing shingle.

5. The roofing system of claim 1, wherein each of the plurality of metal roofing shingles comprise at least one cooperating feature, wherein the first fastener extends through:

the at least one cooperating feature of the first metal roofing shingle, and the at least one cooperating feature of the second metal roofing shingle, so that the at least one cooperating feature of the first metal roofing shingle is engaged with the at least one cooperating feature of the second metal roofing shingle.

6. The roofing system of claim 1, wherein each of the plurality of metal roofing shingles includes an adhesive, wherein at least some of the plurality of fasteners penetrates the adhesive of at least one of the first metal roofing shingle or the second metal roofing shingle.

7. A method, comprising:

obtaining a photovoltaic module and a plurality of metal roofing shingles, wherein the photovoltaic module includes at least one solar cell, wherein the plurality of metal roofing shingles includes at least a first metal roofing shingle, a second metal roofing shingle, and a third metal roofing shingle, wherein each of the plurality of metal roofing shingles includes a metal layer, wherein the metal layer includes a conductive metal material, wherein the metal layer includes a side lap;

installing the photovoltaic module on a roof deck;

installing the first metal roofing shingle in a first row on the roof deck, adjacent to the photovoltaic module;

installing the second metal roofing shingle in the first row on the roof deck, adjacent to the first metal roofing shingle, wherein the side lap of the metal layer of the second metal roofing shingle overlays and is in electrical contact with the side lap of the metal layer of the first metal roofing shingle, to form a first grounding path; and installing the third metal roofing shingle in a second row on the roof deck, wherein the second row is adjacent the first row on the roof deck, wherein the third metal roofing shingle is in electrical contact with the first metal roofing shingle, to form a second grounding path; and obtaining a washer, wherein the washer includes a through hole, wherein the installing the second metal roofing shingle includes positioning a washer between the metal layer of the first metal roofing shingle, and the metal layer of the second metal roofing shingle; and disposing a fastener through each of the metal layer of the first metal roofing shingle, the metal layer of the second metal roofing shingle, the through hole of the washer, and the roof deck.

8. The method of claim 7, wherein the first grounding path is in electrical connection with the second grounding path.

9. The method of claim 7, wherein the installing the first metal roofing shingle includes penetrating, with the fastener, each of the metal layer of the first metal roofing shingle, the metal layer of the second metal roofing shingle, and the roof deck.

10. The method of claim 7, wherein the fastener includes a fastener head, a fastener shaft extending from the fastener head, and at least one fastener barb extending from the fastener head;

wherein the installing the second metal roofing shingle includes penetrating, with the fastener shaft of the fastener, each of the metal layer of the first metal roofing shingle, the metal layer of the second metal roofing shingle, and the roof deck; and penetrating, with the at least one fastener barb of the fastener, each of the metal layer of the first metal roofing shingle, and the metal layer of the second metal roofing shingle.

11. The method of claim 7, wherein the fastener includes a fastener head, a fastener shaft extending from the fastener head, and at least one fastener barb extending from the fastener shaft;

wherein the installing the second metal roofing shingle includes penetrating, with the fastener shaft of the fastener, each of the metal layer of the first metal roofing shingle, the metal layer of the second metal roofing shingle, and the roof deck; and urging toward one another, with the at least one fastener barb of the fastener, each of the metal layer of the first metal roofing shingle, and the metal layer of the second metal roofing shingle.

12. The method of claim 7, wherein the fastener includes a fastener head, a fastener shaft extending from the fastener head, and at least one fastener barb extending from the fastener shaft;

wherein the installing the second metal roofing shingle includes penetrating, with the fastener shaft of the fastener, each of the metal layer of the first metal roofing shingle, the metal layer of the second metal roofing shingle, and the roof deck; and urging toward one another, with the at least one fastener barb of the fastener, each of the metal layer of the first metal roofing shingle, and the metal layer of the second metal roofing shingle.

13. The method of claim 7, wherein each of the plurality of metal roofing shingles includes at least one cooperating feature, wherein the installing the second metal roofing shingle includes installing a fastener through each of the at least one cooperating feature of the first metal roofing shingle, and the at least one cooperating feature of the second metal roofing shingle, so that the at least one cooperating feature of the first metal roofing shingle is engaged with a corresponding at least one cooperating feature of the second metal roofing shingle.

14. A roofing system, comprising:

a roof deck;

a plurality of photovoltaic modules installed on the roof deck, wherein each of the plurality of photovoltaic modules includes at least one solar cell; and a plurality of metal roofing shingles installed on the roof deck adjacent to the plurality of photovoltaic modules, wherein the plurality of metal roofing shingles includes at least a first metal roofing shingle, a second metal roofing shingle, and a third metal roofing shingle, wherein the first metal roofing shingle and the second metal roofing shingle are installed in a first row on the roof deck, wherein the third metal roofing shingle is installed in a second row on the roof deck, wherein the second row is adjacent the first row on the roof deck, wherein each of the plurality of metal roofing shingles includes a metal layer, wherein the metal layer includes a conductive metal, wherein the metal layer includes a side lap, wherein the side lap of the metal layer of the second metal roofing shingle overlays and is in electrical contact with the side lap of the metal layer of the first metal roofing shingle, to form a first grounding path, wherein the third metal roofing shingle is in electrical contact with the first metal roofing shingle, to form a second grounding path; and a plurality of fasteners, wherein the plurality of fasteners includes at least a first fastener, a second fastener, and a third fastener, wherein each of the plurality of fasteners includes:

a fastener head, a fastener shaft extending from the fastener head, and at least one fastener barb extending from the fastener head, wherein the fastener shaft of the first fastener penetrates each of:

the metal layer of the first metal roofing shingle, the metal layer of the second metal roofing shingle, and the roof deck, wherein the at least one fastener barb of the first fastener penetrates:

the metal layer of the first metal roofing shingle, and the metal layer of the second metal roofing shingle, wherein the fastener shaft of the second fastener penetrates each of:

the metal layer of the first metal roofing shingle, the metal layer of the third metal roofing shingle, and the roof deck, wherein the at least one fastener barb of the second fastener penetrates:

the metal layer of the first metal roofing shingle, and the metal layer of the third metal roofing shingle.

* * * * *